United States Patent [19]

Turpin, Sr. et al.

[11] Patent Number: 4,827,553
[45] Date of Patent: May 9, 1989

[54] PIPELINE BULK RESIDUE REMOVER AND METHOD

[76] Inventors: Robert T. Turpin, Sr.; Gary D. Miracle, both of 1425 Louise Dr., Ashland, Ky. 41101

[21] Appl. No.: 10,412

[22] Filed: Feb. 3, 1987

[51] Int. Cl.⁴ .......................... B08B 1/00; B08B 7/00; B08B 9/00; F16L 45/00
[52] U.S. Cl. ...................... 15/104.18; 134/6; 134/8; 134/21; 134/24; 134/22.18; 134/22.1; 134/36; 134/39
[58] Field of Search ................. 15/104.3 SN, 104.1 R, 15/230.19, 104.18, 236 C; 134/22.1, 6, 8, 22.18, 24, 36, 39, 21

[56] References Cited

U.S. PATENT DOCUMENTS

| | | | |
|---|---|---|---|
| 754,952 | 3/1904 | Smith et al. | 15/104.18 |
| 1,174,220 | 3/1916 | Zilliox | 15/104.18 |
| 1,180,485 | 4/1916 | French | 15/104.18 |
| 1,191,236 | 7/1916 | Rigo | 15/104.18 |
| 1,295,969 | 4/1919 | Carmichael | 15/104.18 |
| 1,593,072 | 7/1926 | Haydock et al. | 15/104.05 |
| 1,653,883 | 12/1927 | Spencer | 15/104.05 |
| 1,807,123 | 5/1931 | McCarter | 15/104.05 |
| 2,124,869 | 7/1938 | Rea | 166/10 |
| 2,141,508 | 12/1938 | Buckley et al. | 166/18 |
| 2,304,023 | 12/1942 | Sandin | 15/104.18 |
| 2,317,542 | 4/1943 | Lincoln | 15/104.18 |
| 2,328,060 | 8/1943 | Crane et al. | 15/104.05 |
| 2,734,208 | 2/1956 | Griffin | 15/104.18 |
| 2,803,026 | 8/1957 | Koffski | 15/104.07 |
| 2,958,884 | 11/1960 | Hill et al. | 15/104.19 |
| 3,079,932 | 3/1963 | Fassenbler | 15/104.18 |
| 3,570,597 | 3/1971 | Lack | 166/174 |
| 4,326,893 | 4/1982 | Clifford | 134/8 |
| 4,666,530 | 5/1987 | Houser | 134/22.1 |

Primary Examiner—H. M. S. Sneed
Assistant Examiner—Sharon T. Cohen
Attorney, Agent, or Firm—Fleit, Jacobson, Cohn & Price

[57] ABSTRACT

A pipline bulk residue remover and method for efficiently removing such residue. The apparatus includes a cable passing through the length of a pipeline potentially thousands of feet in length and connected to a device at each end to enable the cable to be moved in opposite linear directions together with a unique pipe cleaning device consisting of a central tubular structure provided with a plurality of radially extending pivotal plates in staggered sets with the plates being freely swingable in one direction and prevented from free swinging in the other direction so that the periphery of the plates can be located adjacent the internal periphery of the pipeline for removing residue therefrom in one direction of movement and passing freely through the pipeline in the other direction of movement. The method involves the insertion of the cable through the pipeline, entry of the cleaning device and reciprocation of the cleaning device in short increments determined by the quantity of residue in the pipeline and the amount of tension measured on the cable so that the residue can be incrementally removed with maximum efficiency through an exit point in order to avoid sticking of the pipe cleaning device in the pipeline and to reduce the power requirements and size requirements of the apparatus.

2 Claims, 2 Drawing Sheets

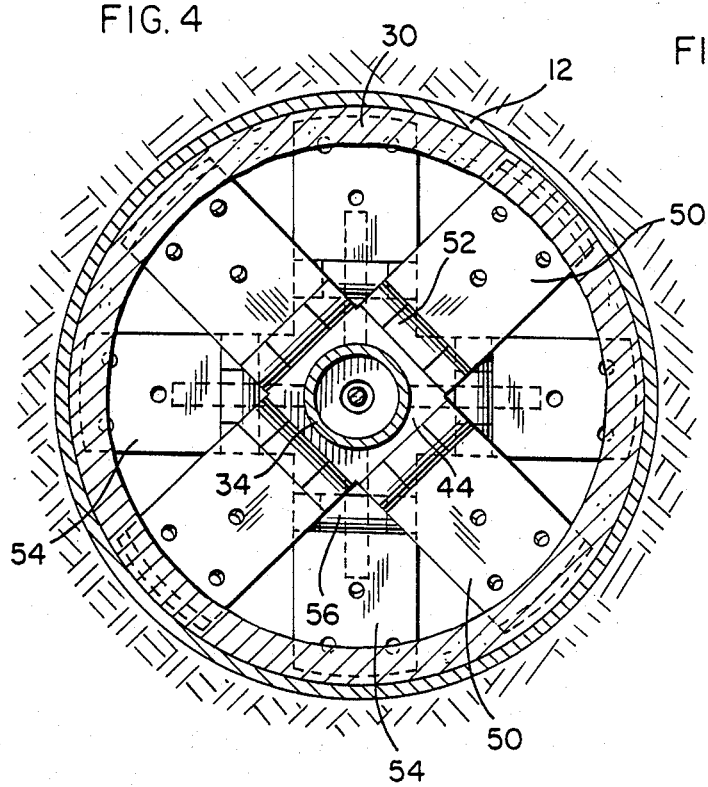
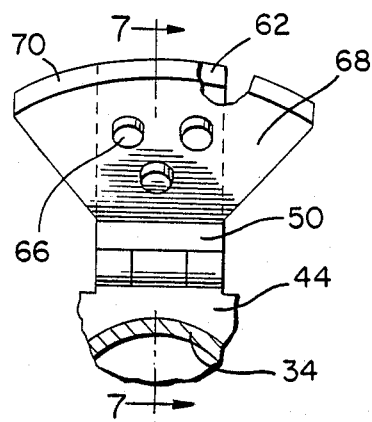
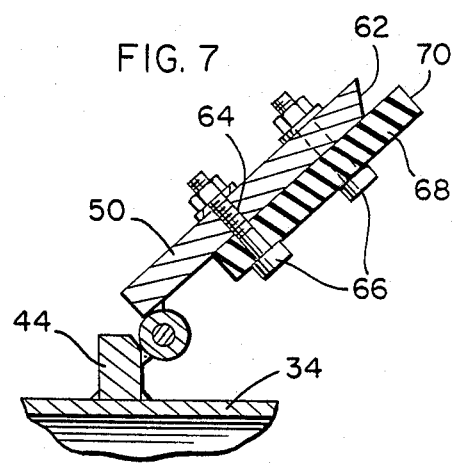
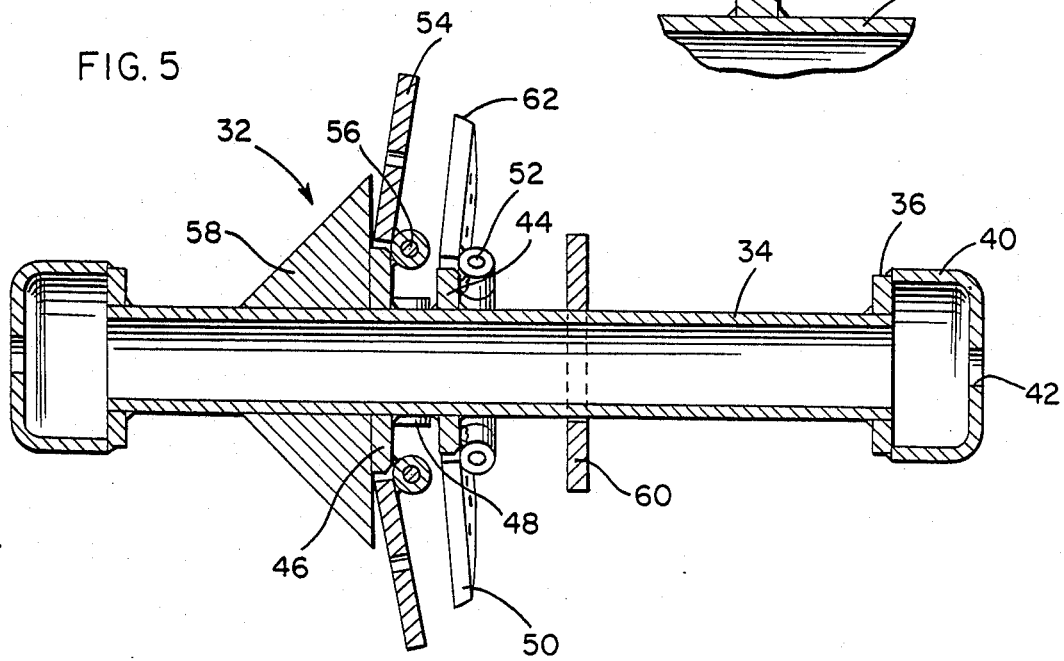

PIPELINE BULK RESIDUE REMOVER AND METHOD

BACKGROUND OF THE INVENTION

1. Field of the Invention

The present invention generally relates to an apparatus for removing bulk residue from pipelines and a method of efficiently removing such residue. The apparatus includes a cable passing through the length of a pipeline and connected to a device at each end to enable the cable to be moved in opposite linear directions together with a unique pipe cleaning device consisting of a central tubular structure provided with a plurality of radially extending pivotal plates in staggered sets with the plates being freely swingable in one direction and prevented from free swinging in the other direction so that the periphery of the plates can be located adjacent the internal periphery of the pipeline for removing residue therefrom in one direction of movement and passing freely through the pipeline in the other direction of movement. The method involves the insertion of the cable through the pipeline, entry of the cleaning device and reciprocation of the cleaning device in short increments determined by the quantity of residue in the pipeline so that the residue can be incrementally removed through an exit point in order to avoid sticking of the pipe cleaning device in the pipeline and to reduce the power requirements and size requirements of the apparatus. The length of the increment of pipe being cleaned and the force required for material removal are measured and monitored which enables maximum removal efficiency and insures that the removal equipment is not overstressed and that the pipeiine is not damaged.

2. Information Disclosure Statement

A problem has long existed of cleaning pipe systems which have been partially clogged by buildup of material on the interior surface of the pipes thereby decreasing the capacity of the pipes and requiring additional energy to pump materials through the pipe. Various procedures, techniques and apparatuses have been developed in an effort to alleviate this problem including removal of the old pipe and replacement with new pipe, flushing the piping system with high pressure fluids or fluids with cleaning additives and by mechanically removing the residue by using various cleaning devices. Prior art relating to the developments in this field will be included in a separate subsequently filed Information Disclosure Statement.

SUMMARY OF THE INVENTION

An object of the present invention is to provide a pipeline bulk residue remover in the form of a reciprocal pipe cleaning device moved in opposite directions through a pipeline and pipeline bends by a cable connected to the pipe cleaning device and extending outwardly of a section of pipe at the ends thereof and connected to apparatuses capable of moving the cable in opposite linear directions and those apparatuses being capable of determining cable tension loading and cable length in the pipe. The pipeline cleaning device includes a plurality of radially extending pivotal plates arranged in two or more longitudinally spaced sets with each set of plates being freely pivotal in one direction by the use of a hinge structure with a stop mechanism precluding pivotal movement of the plates in the opposite direction so that the pipe cleaning device can move freely in one linear direction through the pipe and residue therein and when moved in the opposite direction, the pivotal plates will be pivoted to an outwardly extending position so that edges of the plates are positioned closely adjacent the interior periphery of the pipe thereby removing residue from the pipe when the pipe cleaning device is moved in the opposite direction.

Another object of the invention is to provide a method of removing bulk residue from pipelines which includes the step of providing access to end portions of a pipe section that may be thousands of feet in length, inserting a cable through the pipe section, connecting a pipeline cleaning device to the cable and connecting opposite ends of the cable to apparatuses for moving the cable in opposite linear directions with the pipe cleaning device entering one end of the pipe from which residue will subsequently be removed and moved a short distance into the pipe section after which the pipeline cleaner is moved in the opposite direction for removing the residue from that section of the pipe and discharging it from the exit end thereof with this procedure being repetitive until the complete length of the pipe section has been cleaned of residue with the incremental cleaning and removal of residue enabling the cleaning operation to be performed with a pipe cleaning device and associated apparatus of less rugged construction and enabling less force to be used to move the pipe cleaning device to remove bulk residue from the pipe section.

A further object of the invention is to provide a pipeline residue remover and method which includes the provision of special cleaning implements attached on at least certain of the pivotal plates increasing the overall diameter of the pipe cleaning device for assisting in removal of materials of varied consistency such as resilient attachments for a squeegee action for thoroughly cleaning the interior surface of the pipe or nylon attachments for lined or soft walled pipe or stiff wire brush attachments removing hard materials or very abrasive attachments for scoring or scraping the pipe wall.

Still another object of the invention is to provide an apparatus and method to remove heavy residue buildup from inside piping in an efficient and economical manner without resulting in the cleaning device becoming stuck in the pipe section and at a cost substantially less than the purchase price of replacement pipes.

Another object of the invention is to maximize cleaning efficiency by measuring the force required to clean a pipe segment and measure the length of that segment. Then, as the cleaning proceeds adjust the length of the segment being cleaned until the force required to clean that length of segment approaches the maximum allowable force available with the pulling apparatuses.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a transverse sectional view taken substantially upon a plane passing along section line 4—4 on FIG. 2 illustrating further structural details of the pipe cleaning device.

FIG. 5 is a longitudinal sectional view of the pipe cleaning device illustrating further structural details.

FIG. 6 is a fragmental elevational view of one of the pivotal plates with a special cleaning implement attached thereto.

FIG. 7 is a sectional view taken substantially upon a plane passing along section line 7—7 on FIG. 6 illustrating further structural details of a special cleaning implement.

DESCRIPTION OF THE PREFERRED EMBODIMENT

Figure 2:
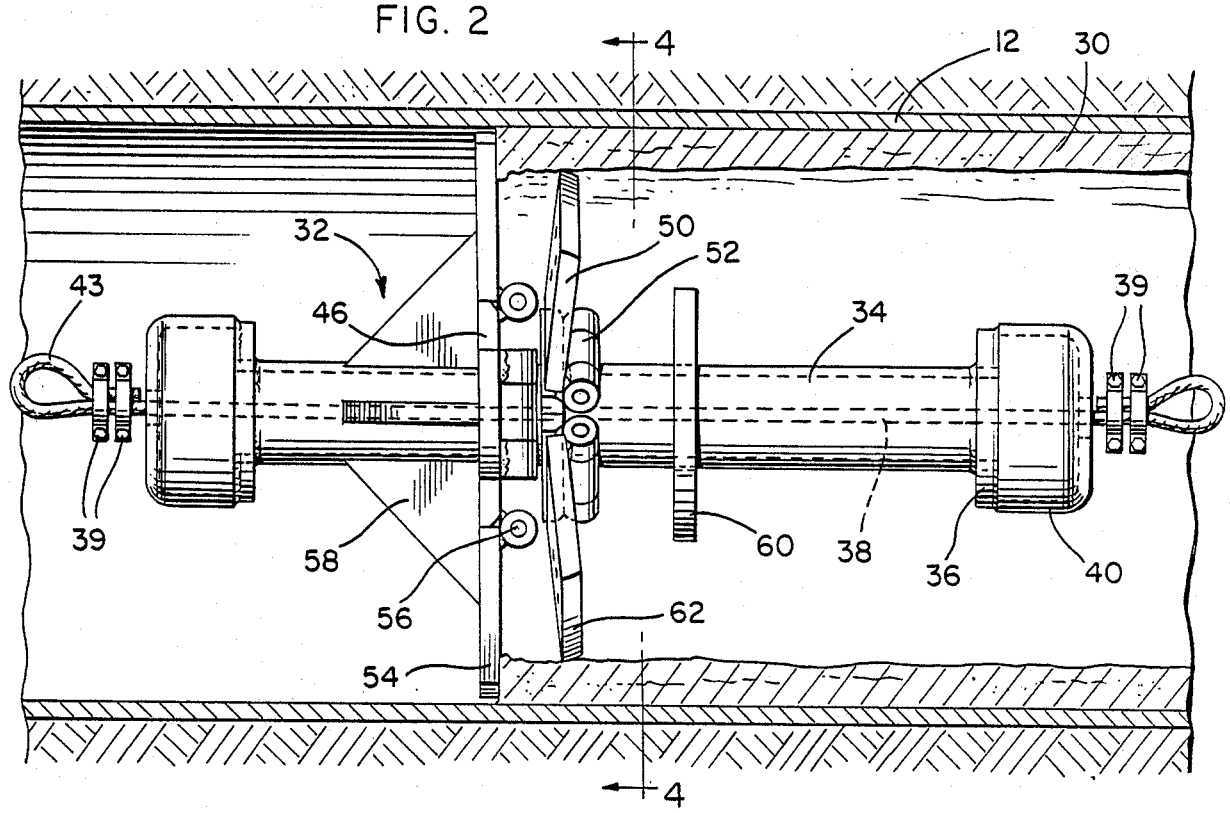
FIG. 2 is a side elevational view of the pipe cleaning device illustrating its association with the pipe and residue of the interior surface thereof during the removal operation.

Referring now specifically to the drawings, an underground piping system with which the present invention is associated is generally designated by reference numeral 10 and includes a section of pipe 12 that may be thousands of feet in length that is provided with accessible ends 14 and 16 which may be in the form of existing openings such as clean-outs, manholes and the like. As illustrated, excavations 18 are provided to gain access to the ends 14 and 16 with a cable 20 extending through the pipe 12 and the ends of the cable are mounted on and connected to winch assemblies 22 and 24 or any other mechanism for exerting forces on the cable 20 to move it in opposite linear directions. A guide roller or sheave 25 is mounted at each end of the pipe 12 by a suitable bracket 26 and clamp structures 28 in order to guide the cable 20 and position it centrally in the pipe 12 as illustrated in FIG. 2. Thus, with this structure the cable 20 can be moved in opposite linear directions within the center of the pipe 12.

Load cell assemblies 23 are mounted on the winch assemblies 22 and 24 to indicate cable tension with digital meters to assure that the cable 20 is not overstressed and allows maximum cleaning efficiency. A footage meter 29 that measures the reeled off cable is attached to each winch assembly 22 and 24 so that the cleaner location and length of the desired section to be cleaned can always be determined.

As illustrated in FIGS. 2 and 4, the pipe 12 has a buildup of heavy residue 30 on the internal surface thereof and in order to remove the residue 30, a pipe cleaning device generally designated by the numeral 32 is mounted within the pipe 12 and connected to the cable 20 for movement therewith.

Figure 1:
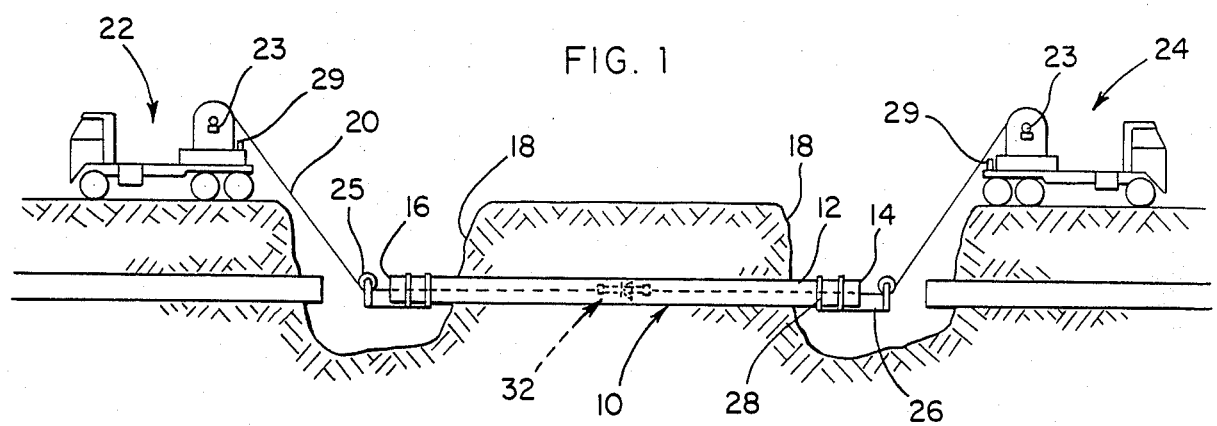
FIG. 1 is a schematic illustration of the pipeline bulk residue remover and method of the present invention.

In removing the residue, it, of course, is first necessary to select a section of pipe 12 to be cleaned and to obtain access to both ends thereof by any of several well known means including the removal of a small section of the pipe as illustrated in FIG. 1 or by use of existing clean-out openings, manholes or the like. Initially, a very small cable is passed through the pipe 12 by attaching the small cable to the rear of a flexible bullet-shaped projectile made of polyurethane, neoprene or similar material of a diameter that forms a pressure seal around the material inside the pipe. Such a device is well known in the field as a clean-out pig and this projectile is launched into the pipe and is moved through the pipe by fluid pressure connected to an external source with the projectile or pig being forced through the pipe and pulling the small cable with it. The propelling fluid is preferably a liquid or compressed air may be use in some instances. If the material internally of the pipe is flammable, than an inert gas is used such as nitrogen. In any event, the projectile or pig is launched and forced through the pipe and pulls the small cable with it so that the projectile pig along with the end of the small cable is discharged from the opposite end of the pipe 12. The cable 20 which is of greater strength and size is then attached to the small cable and pulled longitudinally through the pipe 12. The cable 20 is provided with the necessary strength requirements for pulling the pipe cleaning device 32 in a manner described hereinafter.

The pipe cleaning device 32 includes an elongated rigid tube or pipe 34 having a rigid circular plate 36 slipped over each end of the pipe 34 and attached thereto by welding or the like. A hollow end cap 40 of cup-shaped configuration is rigidly affixed to each plate 36 and includes an apertures 42 in the outer end thereof which receives the cable 20. A pair of mounting plates 44 and 46 are rigidly secured to the pipe or tube 34 by welding or the like with a spacer 48 positioned therebetween. Each of the plates 44 and 46 are of square configuration and the plate 44 is located in front of the plate 46 that is, towards the direction of movement of the pipeline cleaner 32 when it is removing the residue 30 from the pipe 12. Each side edge of the mounting plate 44 includes a pivotal plate 50 connected thereto by a hinge 52. The hinge 52 is oriented on the front of the mounting plate 44 and the pivotal plates 50 so that when the plates 50 extend substantially radially, the inner edge of the plates 50 will abut against the peripheral edge portions of the mounting plate 44 thereby forming a one-way hinge which enables the plates 50 to pivot inwardly so that the free ends thereof move toward the tube or pipe 34 when the pipeline cleaning device 32 is moved towards the end 16 of the pipe 12 with the plates 50 pivoting outwardly to their operative position as illustrated in FIGS. 2, 4 and 5 when the pipeline cleaner 32 is moved toward the end 14 of the plate 12. The overall design and size allows it to be placed at any point in the pipe 12 and pass through pipe direction changes including short radius 90° bends.

The mounting plate 46 includes similar plates 54 attached to the side edges thereof by hinges 56 which are arranged in the said manner as the hinges 52 so that the plates 54 can swing inwardly when the pipeline cleaner is moved toward the end 16 and will pivot outwardly to an operative position when moved in the other direction toward the end 14 with the inner edges of the plate 54 abutting the outer edges of the mounting plate 46 when extending radially. The pipe or tube 34 is provided with a plurality of triangular gusset-type braces 58 welded thereto immediately inwardly of the mounting plate 46 in order to reinforce and brace the plates 54 when they approach their radial operative position. The triangular gusset-like braces 58 also serve to raise the cleaner out of the residue 30 as the cleaner is positioned in the pipe 12. This helps prevent residue accumulation due to the cleaner entering the pipe and creating a sticking problem. Also, a front plate 60 is mounted on the pipe or tube 34 forwardly of the front plates 50 in order to limit the inward swinging movement thereof with the plates 54 being limited by contacting the radial edges of the plates 50.

As illustrated in FIG. 7, the outer end edge of each front plate 50 is bevelled at 62 and a plurality of apertures 64 are provided in each of the front plates 50 and back plates 54 for receiving fastening bolts 66 which mount special cleaning implements 68 to the plates 50 with the implement 68 having a curved outer edge at 70 and which extends for a longer arc than the curved edges of the plates 50 and 54 and creates a greater overall diameter as illustrated in FIG. 6 with the special cleaning implement 68 being constructed of various materials such as nylon, polyurethane, neoprene, wire brush, hardened steel or the like so that when it engages the interior surface of the pipe 12, it will wipe the interior surface clean with the cleaning element providing a squeegee-type, scouring or cutting type cleaning action when engaged with the interior of the pipe 12.

The pipe cleaning device 32 is secured to the cable 20 by attaching it to a loop 43 formed on each end of a cable 38 passing through the cleaning device 32. The loops 43 are formed by suitable clamps 39 or the like which also engage with the end caps thereby enabling the pipeline cleaning device 32 to be mounted in the cable 20 or removed therefrom when required.

Figure 3:
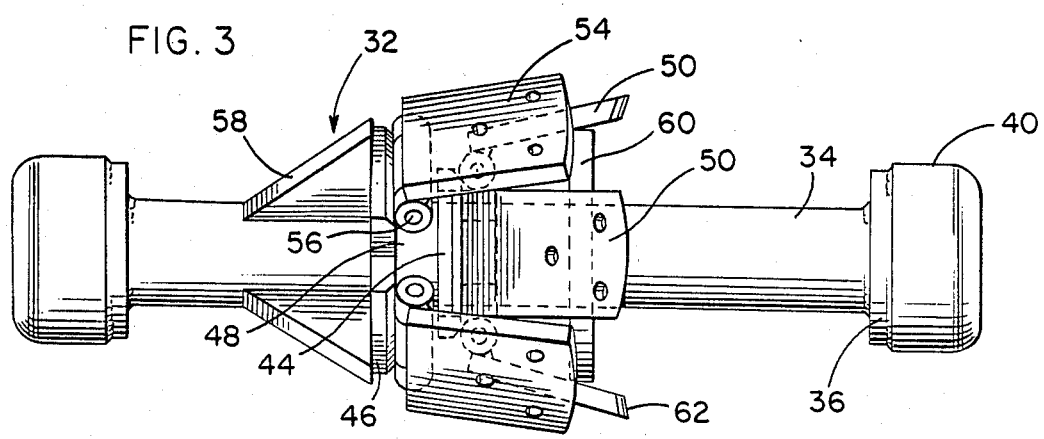
FIG. 3 is a side elevational view of the pipe cleaning device with the pivotal plates in their retracted or collapsed condition.

As indicated previously, the specific construction of the vehicle apparatuses 22 and 24 including the hoist drums thereon are not illustrated since they are of conventional construction as is the launching device for the flexible projectile or pig used to pull the small cable through potentially thousands of feet of the pipe 12 which subsequently pulls the larger cable 20 through the pipe 12. When assembled, the pipeline cleaner 32 will enter the end 14 of the pipe 12 and be in a collapsed position as illustrated in FIG. 3 as it is pulled axially into the pipe 12. When in the collapsed position, the pipeline cleaning device will not bulldoze the residue material into the pipe when the pipe cleaning device is pulled inwardly from the end 14. After the cleaning device is pulled inwardly a short distance determined by the characteristics and quantity of residue material on the pipe, the distance being measured by the footage meter 29, it is stopped and then pulled towards the end 14 for removing the residue material 30 located between the cleaning device 32 and the end 14 of the pipe. During use, the length of the pipe to be cleaned at each cycle of operation may be varied until optimum movement distance is obtained based upon cable tension required. As the cleaning device is pulled toward the end 14 of the pipe 12, the arcuately curved and bevelled or sharpened edges 62, which are held in a slightly elevated position by the front ring or plate 60, will dig into and bulldoze the residue material 30. This expands the front plates 50 to their full diameter which in turn expands the back plates 54 to their full diameter thereby providing the cleaning device with its fully expanded diameter which approaches the inside diameter of the pipe 12. As the cleaning device moves toward the end 14, the expanded plates begin removing residue material by applying a large shear force to the residue material parallel to the pipe 12. This type of shearing action is not only effective for residue removal but also prevents damage to the pipe itself. The dislodged material is pulled out of the end 14 of the pipe 12 where it may be collected by any convenient means and the cleaner is then pulled back into the pipe 12 past the section of pipe just cleaned to a point designated as the end of the second section of the pipe to be cleaned based on optional footage and tension readings and the procedure described above is repeated until the entire pipe 12 is cleaned.

After the section of pipe has been cleaned to its midpoint, a time saving may be obtained if the cleaning device is moved to the opposite end 16 and pulled inwardly for a predetermined distance to clean a first section of the pipe from the end 16 so that the removed residue material does not have to be pulled all of the way from one end of the pipe to the other. After the bulk of material has been removed from the pipe 12, the special cleaning implements 68 are quickly secured to the front plates 50 and back plates 54 and pulled through the pipe for a final residue cleaning action. A completely clean pipe is assured by the fact that the cleaning device can physically pass through the pipe. The special cleaning implements are also helpful in removing materials that become less viscous when disturbed. While the rubber flaps provide a squeegee as a final cleaning action, other configurations of attachments and materials can be attached to the front plates 50 and back plates 54.

The cleaning device can be used to clean a pipe with bends or fittings therein with sticking of the cleaning device being avoided by cleaning the residue materials from directly in front of the bend and then repositioning the cleaning device to remove material from the bend only. This operation is relatively simple since the cleaning device structure enables it to be located at any point in the pipe. If the cleaning device becomes hung in the pipe due to trying to remove too much material at one time, the cleaning device may be removed by pulling it to the opposite end of the pipe in its collapsed position so that the cleaning device can be removed from the cable and reattached at the other end of the pipe so that the cleaning procedure may be resumed with less residual material being removed during each cycle of operation. A cable 41 is shown as extending through the pipe or tube 34 and it is also contemplated that a loop 43 is provided at each end and clampingly engaged with the end caps to provide anchor points for anchoring the ends of independent cables thereby eliminating the necessity of threading the tube 34 onto the cable 20. With this structure and method, any type of piping having a heavy build up of residue material on the interior surface thereof may be quickly, efficiently and economically cleaned without creating added disposal material or damaging the pipe.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A device for removing bulk residue from the interior of a pipe comprising:

an elongated rigid tube having a first and a second end;

an end cap rigidly affixed to each of said first and second ends;

a cable passing through said elongated rigid tube and having a loop formed adjacent each of said first and second ends, said cable extending through apertures formed in each said end cap;

means for pulling said device toward ends of said pipe connected to each said loop;

first and second mounting plates rigidly secured to a central portion of said elongated rigid tube, each of said mounting plates axially spaced along said elongated rigid tube with respect to the other of said mounting plates and including peripheral edge portions;

a first plurality of radially pivotal plates, each of said first plurality of radially pivotal plates including a flat inner edge and a bevelled outer edge;

a second plurality of radially pivotal plates, each of said second plurality of radially pivotal plates including a flat inner edge and an outer edge;

a hinge disposed between and connecting each of said first plurality of radially pivotal plates to the first of said mounting plates so that each of said first plurality of radially pivotal plates is freely swingable between a collapsed position and an expanded position, the flat inner edge of each of said first plurality of radially pivotal plates abutting against the peripheral edge portions of the first mounting plate in the expanded position;

a hinge disposed between and connecting each of said second plurality of radially pivotal plates to the second of said mounting plates so that each of said second plurality of radially pivotal plates is freely swingable between a collapsed position and an expanded position, the flat inner edge of each of said second plurality of radially pivotal plates abutting against the peripheral edge portions of the second mounting plate in the expanded position;

a front plate mounted on said elongated rigid tube at a location between said first end and said first and second mounting plates, each of said first plurality of radially pivotal plates contacting said front plate in said collapsed position;

a plurality of braces provided about said elongated rigid tube adjacent the second of said mounting plates, one of said braces contacting each of said second plurality of radially pivotal plates in said expanded position to reinforce and brace each of said second plurality of radially pivotal plates;

such that, as said device is pulled toward one end of the pipe, said first and second pluralities of radially pivotal plates are disposed in their collapsed positions to permit free passage of the device within said pipe, and such that as said device is pulled toward the other end of the pipe, the bevelled outer edges dig into said residue and swing said first plurality of radially pivotal plates from the collapsed position into the expanded position, said first plurality of pivotal plates in turn expanding said second plurality of radially pivotal plates from the collapsed position in the expanded position, the outer edges of said first and second plurality of radially pivotal plates located adjacent the inside diameter of said pipe in the expanded position and applying a shear force to said residue in a direction parallel to walls of said pipe to remove said residue form the interior of the pipe.

2. A device as defined by claim 1 and further including auxiliary cleaning implements mounted on each of said first plurality of radially pivotal plates.

* * * * *